(12) United States Patent
Sigmund et al.

(10) Patent No.: US 8,442,496 B2
(45) Date of Patent: *May 14, 2013

(54) ENHANCED MESSAGING WITH LANGUAGE TRANSLATION FEATURE

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,198

(22) Filed: Sep. 14, 2012

(65) Prior Publication Data
US 2013/0012173 A1    Jan. 10, 2013

Related U.S. Application Data

(63) Continuation of application No. 12/161,076, filed as application No. PCT/US2008/061437 on Apr. 24, 2008, now Pat. No. 8,306,509.

(60) Provisional application No. 60/969,419, filed on Aug. 31, 2007.

(51) Int. Cl.
*H04M 1/725* (2006.01)
*H04M 11/10* (2006.01)
*H04M 1/64* (2006.01)

(52) U.S. Cl.
USPC ............... 455/413; 455/412.1; 455/412.2; 379/88.06

(58) Field of Classification Search ............. 455/412.1, 455/412.2, 413; 379/88.06; 709/206; 704/8
See application file for complete search history.

(56) References Cited

U.S. PATENT DOCUMENTS

| 5,329,579 | A |   | 7/1994  | Brunson |
| 5,524,137 | A | * | 6/1996  | Rhee ........................... 379/88.01 |
| 5,572,578 | A |   | 11/1996 | Lin et al. |

(Continued)

FOREIGN PATENT DOCUMENTS

| EP | 0 631 452 | 12/1994 |
| EP | 1 113 631 | 7/2001 |

(Continued)

OTHER PUBLICATIONS

U.S. Office Action dated Oct. 4, 2012 in U.S. Appl. No. 12/485,484.

(Continued)

*Primary Examiner* — Michael Faragalla
*Assistant Examiner* — Scott Au
(74) *Attorney, Agent, or Firm* — Hartman & Citrin LLC

(57) ABSTRACT

A method for creating and managing a distribution list can include creating a distribution list at a voicemail system. The distribution list can include at least one recipient and at least one language preference for one or more of the at least one recipients. The method can further include selecting the created distribution list and recording an audio message to be sent to the at least one recipient. Translating the audio message into the at least one language preference for one or more of the at least one recipients thereby creating at least one translated audio message and sending the at least one translated audio message to the at least one recipient.

20 Claims, 11 Drawing Sheets

U.S. PATENT DOCUMENTS

| | | | |
|---|---|---|---|
| 5,737,394 A | 4/1998 | Anderson et al. | |
| 5,737,395 A | 4/1998 | Irribarren | |
| 5,809,111 A | 9/1998 | Matthews | |
| 6,005,870 A | 12/1999 | Leung et al. | |
| 6,108,559 A * | 8/2000 | .Ang.strom et al. | 455/466 |
| 6,148,212 A | 11/2000 | Park et al. | |
| 6,246,871 B1 | 6/2001 | Ala-Laurila | |
| 6,335,962 B1 * | 1/2002 | Ali et al. | 379/88.11 |
| 6,351,523 B1 | 2/2002 | Detlef | |
| 6,360,272 B1 | 3/2002 | Lincke et al. | |
| 6,480,885 B1 | 11/2002 | Olivier | |
| 6,522,727 B1 | 2/2003 | Jones | |
| 6,751,298 B2 | 6/2004 | Bhogal et al. | |
| 6,829,334 B1 | 12/2004 | Zirngibl | |
| 6,879,847 B1 | 4/2005 | Kato | |
| 6,912,275 B1 | 6/2005 | Kaplan | |
| 6,937,868 B2 | 8/2005 | Himmel et al. | |
| 6,981,023 B1 | 12/2005 | Hamilton et al. | |
| 7,095,828 B1 | 8/2006 | Elliot et al. | |
| 7,142,648 B1 | 11/2006 | Miller | |
| 7,171,186 B2 | 1/2007 | Miyachi et al. | |
| 7,248,857 B1 | 7/2007 | Richardson et al. | |
| 7,277,529 B1 | 10/2007 | Wuthnow et al. | |
| 7,283,809 B1 | 10/2007 | Weinman | |
| 7,369,648 B1 | 5/2008 | Chang | |
| 7,680,491 B2 | 3/2010 | Zabawskyj et al. | |
| 7,738,833 B2 | 6/2010 | Bettis et al. | |
| 7,796,977 B2 | 9/2010 | Vander Veen | |
| 7,826,831 B2 | 11/2010 | Bettis et al. | |
| 7,894,580 B2 | 2/2011 | Veen et al. | |
| 8,320,535 B2 | 11/2012 | Alperin et al. | |
| 2002/0015403 A1 | 2/2002 | McConnell et al. | |
| 2002/0037075 A1 | 3/2002 | Flanagan | |
| 2002/0049768 A1 | 4/2002 | Peek et al. | |
| 2002/0077098 A1 | 6/2002 | Tiliks et al. | |
| 2002/0112007 A1 | 8/2002 | Wood et al. | |
| 2002/0115429 A1 | 8/2002 | Deluca et al. | |
| 2003/0091169 A1 | 5/2003 | Cain | |
| 2003/0099341 A1 | 5/2003 | Williams | |
| 2003/0220784 A1 | 11/2003 | Fellenstein et al. | |
| 2004/0023643 A1 | 2/2004 | Vander Veen et al. | |
| 2004/0081088 A1 | 4/2004 | Schinner et al. | |
| 2004/0139471 A1 | 7/2004 | Geen et al. | |
| 2004/0146147 A1 | 7/2004 | Picard et al. | |
| 2004/0248594 A1 | 12/2004 | Wren | |
| 2004/0252679 A1 | 12/2004 | Williams et al. | |
| 2004/0264658 A1 | 12/2004 | Cline et al. | |
| 2005/0089149 A1 | 4/2005 | Elias | |
| 2005/0102368 A1 | 5/2005 | Forman et al. | |
| 2005/0113078 A1 | 5/2005 | Deitrich | |
| 2005/0186944 A1 | 8/2005 | True et al. | |
| 2005/0213715 A1 | 9/2005 | Winick | |
| 2006/0003745 A1 | 1/2006 | Gogic | |
| 2006/0025114 A1 | 2/2006 | Bales et al. | |
| 2006/0025140 A1 | 2/2006 | Bales et al. | |
| 2006/0031470 A1 | 2/2006 | Chen et al. | |
| 2006/0059361 A1 | 3/2006 | Paden | |
| 2006/0062356 A1 | 3/2006 | Vendrow | |
| 2006/0171511 A1 | 8/2006 | Liu et al. | |
| 2006/0173959 A1 | 8/2006 | McKelvie et al. | |
| 2006/0239419 A1 | 10/2006 | Joseph et al. | |
| 2006/0251222 A1 | 11/2006 | Abramson et al. | |
| 2006/0253584 A1 | 11/2006 | Dixon et al. | |
| 2006/0281443 A1 | 12/2006 | Chen et al. | |
| 2007/0038483 A1 | 2/2007 | Wood | |
| 2007/0066284 A1 | 3/2007 | Gatzke et al. | |
| 2007/0127632 A1 | 6/2007 | Swingle et al. | |
| 2007/0127663 A1 | 6/2007 | Bae | |
| 2007/0140443 A1 * | 6/2007 | Woodring | 379/88.06 |
| 2007/0143106 A1 | 6/2007 | Dunsmuir | |
| 2007/0173233 A1 | 7/2007 | Vander Veen et al. | |
| 2007/0180032 A1 * | 8/2007 | Pearson | 709/206 |
| 2007/0180504 A1 | 8/2007 | Hung | |
| 2007/0207785 A1 | 9/2007 | Chatterjee et al. | |
| 2007/0213050 A1 | 9/2007 | Jiang | |
| 2007/0223666 A1 | 9/2007 | Teague | |
| 2007/0287453 A1 | 12/2007 | Wang | |
| 2008/0008163 A1 | 1/2008 | Castell et al. | |
| 2008/0008299 A1 | 1/2008 | Didcock et al. | |
| 2008/0056459 A1 | 3/2008 | Vallier et al. | |
| 2008/0062246 A1 | 3/2008 | Woodworth et al. | |
| 2008/0062938 A1 | 3/2008 | Gil-soo et al. | |
| 2008/0081609 A1 | 4/2008 | Burgan et al. | |
| 2008/0140767 A1 | 6/2008 | Rao et al. | |
| 2008/0167007 A1 | 7/2008 | Novick et al. | |
| 2008/0167010 A1 | 7/2008 | Novick et al. | |
| 2008/0167014 A1 | 7/2008 | Novick et al. | |
| 2008/0188204 A1 | 8/2008 | Gavner et al. | |
| 2008/0200152 A1 | 8/2008 | Moore | |
| 2008/0207176 A1 | 8/2008 | Brackbill et al. | |
| 2008/0243513 A1 | 10/2008 | Bucchieri et al. | |
| 2008/0260118 A1 | 10/2008 | Lyle | |
| 2008/0298459 A1 | 12/2008 | Yang et al. | |
| 2008/0300873 A1 | 12/2008 | Siminoff | |
| 2009/0149220 A1 | 6/2009 | Camilleri et al. | |
| 2009/0239507 A1 | 9/2009 | Sigmund et al. | |
| 2009/0253407 A1 | 10/2009 | Sigmund et al. | |
| 2009/0253412 A1 | 10/2009 | Sigmund et al. | |
| 2009/0253413 A1 | 10/2009 | Sigmund et al. | |
| 2010/0159886 A1 | 6/2010 | Sigmund et al. | |
| 2010/0159888 A1 | 6/2010 | Sigmund et al. | |
| 2010/0159889 A1 | 6/2010 | Sigmund et al. | |
| 2010/0159890 A1 | 6/2010 | Sigmund et al. | |
| 2010/0159891 A1 | 6/2010 | Sigmund et al. | |
| 2010/0166161 A1 | 7/2010 | Dhawan et al. | |
| 2010/0167699 A1 | 7/2010 | Sigmund et al. | |
| 2010/0189229 A1 | 7/2010 | Sigmund et al. | |
| 2010/0195807 A1 | 8/2010 | Sigmund et al. | |
| 2010/0222024 A1 | 9/2010 | Sigmund et al. | |
| 2011/0085646 A1 | 4/2011 | Sigmund et al. | |
| 2013/0010937 A1 | 1/2013 | Sigmund et al. | |

FOREIGN PATENT DOCUMENTS

| | | |
|---|---|---|
| EP | 1 434 415 | 6/2004 |
| EP | 1 599 022 | 11/2005 |
| KR | 20050001246 | 1/2005 |
| WO | WO 97/45991 | 12/1997 |
| WO | WO 98/03005 | 1/1998 |
| WO | WO 2000/073947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Office Action dated Oct. 2, 2012 in U.S. Appl. No. 12/485,961.
U.S. Office Action dated Sep. 14, 2012 in U.S. Appl. No. 12/161,064.
U.S. Notice of Allowance dated Nov. 16, 2012 in U.S. Appl. No. 12/161,027.
U.S. Office Action dated Oct. 11, 2012 in U.S. Appl. No. 12/160,946.
U.S. Notice of Allowance dated Oct. 25, 2012 in U.S. Appl. No. 12/160,940.
U.S. Notice of Allowance dated Nov. 23, 2012 in U.S. Appl. No. 12/485,335.
U.S. Notice of Allowance dated Nov. 21, 2012 in U.S. Appl. No. 12/477,971.
U.S. Notice of Allowance dated May 26, 2011 in U.S. Appl. No. 12/201,945.
U.S. Official Action dated Sep. 19, 2011 in U.S. Appl. No. 12/477,971.
U.S. Official Action dated Apr. 25, 2012 in U.S. Appl. No. 12/477,971.
U.S. Official Action dated Oct. 13, 2011 in U.S. Appl. No. 12/485,335.

U.S. Official Action dated May 22, 2012 in U.S. Appl. No. 12/485,335.
U.S. Official Action dated Apr. 27, 2012 in U.S. Appl. No. 12/160,931.
U.S. Office Action dated Aug. 30, 2012 in U.S. Appl. No. 12/160,931.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 24, 2012 in U.S. Appl. No. 12/160,940.
U.S. Official Action dated Apr. 26, 2012 in U.S. Appl. No. 12/160,946.
U.S. Official Action dated Nov. 4, 2011 in U.S. Appl. No. 12/160,956.
U.S. Official Action dated Jun. 6, 2012 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Notice of Allowance dated Jun. 21, 2012 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Jul. 30, 2012 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Jun. 6, 2012 in U.S. Appl. No. 12/161,033.
U.S. Notice of Allowance dated Jul. 24, 2012 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Official Action dated Jul. 18, 2012 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
U.S. Notice of Allowance dated Jul. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
U.S. Notice of Allowance dated Feb. 28, 2013 in U.S. Appl. No. 12/161,064.
U.S. Office Action dated Feb. 28, 2013 in U.S. Appl. No. 13/654,480.
U.S. Notice of Allowance dated Jan. 31, 2013 in U.S. Appl. No. 12/485,961.

* cited by examiner

ENHANCED MESSAGING WITH LANGUAGE TRANSLATION FEATURE

RELATED APPLICATION

This application is a continuation of U.S. application Ser. No. 12/161,076, now U.S. Pat. No. 8,306,509, entitled "Enhanced Messaging with Language Translation Feature," filed Apr. 24, 2008, which is a National Phase Application of PCT Application No. PCT/US08/61437 filed Apr. 24, 2008, which claims priority to U.S. Provisional Patent Application No. 60/969,419, filed Aug. 31, 2007, the entirety of each which is hereby incorporated by reference.

TECHNICAL FIELD

The present disclosure relates generally to wireless messaging systems and, more particularly, to enhanced wireless messaging with a language translation feature.

BACKGROUND

Wireless messaging services, such as text messaging, allow users to generate and send messages to other users within a wireless communications network. Typically, a text message is sent to a Short Message Service Center (SMSC) that stores the text message and attempts to send the message to the recipient. If the recipient is not available, the SMSC queues the message for a later retry attempt. This type of delivery system is commonly referred to as a store-and-forward delivery system.

Multimedia Messaging Service (MMS) allows users to exchange multimedia communications between capable mobile phones and other devices. MMS is an extension of the SMS protocol that defines a way to send and receive messages that include images, audio, and video in addition to text.

Voicemail systems allow a caller to leave a voice message if the desired recipient is unavailable. When a called line with voicemail functionality does not answer or is busy, a call can be forwarded to a voicemail system. When a call is forwarded to a voicemail system, the voicemail system can play one or more recordings and/or announcements for the calling party or a generic message and can prompt the calling party to leave a message, for example, a spoken message. The voicemail system can record the calling party's message and store the message, for example, as audio data in a storage device. Call data associated with the message, for example, the calling party's telephone number, the date and time of the call, and the like, can also be stored by the voicemail system and associated with the stored message. Some voicemail systems also allow calling parties to leave alphanumeric messages for a called party. In any event, the voicemail system can store the message or data and associated call data.

SUMMARY

A method for creating and managing a distribution list at a voicemail system, wherein the distribution list can include at least one recipient and at least one language preference for one or more of the at least one recipients, is taught. The method can include selecting the created distribution list, recording an audio message to be sent to the at least one recipient, translating the audio message into the at least one language preference for one or more of the at least one recipients thereby creating at least one translated audio message, if the audio message is not in the language identified by the at least one language preference, and sending the at least one translated audio message to the at least one recipient.

In one embodiment, creating the distribution list at a voicemail system includes creating the distribution list at a network voicemail system. The network voicemail system can be a network plain old voicemail system or a network visual voicemail system, for example.

In another embodiment, creating the distribution list at a voicemail system can include creating the distribution list at a voicemail application stored in a memory of a user device.

In yet another embodiment, sending the at least one translated audio message to the at least one recipient can include sending the at least one translated audio message as a voicemail message and/or as a multimedia message.

A method for creating and managing a message can include creating a message, selecting at least one recipient and at least one language preference for one or more of the at least one recipients, translating the message into the at least one language preference for one or more of the at least one recipients thereby creating at least one translated message, if the message is not in the language identified by the at least one language preference, and sending the at least one translated message to the at least one recipient.

In one embodiment, sending the at least one translated message to the at least one recipient can include sending the at least one translated message as at least one of a voicemail message, as an audio message, as a video message, or as a text message, for example.

A method for operating a voicemail system can include receiving a call at a voicemail system, wherein the voicemail system can include at least one language preference for the called party. The method can further include prompting a calling party to create a message, creating a message, translating the message into the at least one language preference thereby creating at least one translated message, if the message is not in the language identified by the at least one language preference, and storing the at least one translated message.

In one embodiment, the aforementioned method can further include prompting the calling party to select the at least one language preference.

In one embodiment, receiving the call at a voicemail system can include receiving the call at a plain old voicemail system. In another embodiment, receiving the call at a voicemail system can include receiving the call at a visual voicemail system. In yet another embodiment, receiving the call at a voicemail system can include receiving the call at a voicemail application stored in a memory of a user device.

A method for handling an incoming message can include receiving a message at a called party device, wherein the called party device can include a language preference setting identifying at least one language preference for the called party. The method can further include translating the message into the at least one language preference thereby creating at least one translated message and storing the at least one translated message, if the message is not in the language identified by the at least one language preference.

An enhanced voicemail system can include a memory for storing at least one voicemail account and at least one voicemail message associated therewith. At least one voicemail account can include at least one language preference and a translation module for translating the at least one voicemail message from a first language to at least a second language defined by the at least one language preference, if the voicemail message is not in the language identified by the at least one language preference.

In one embodiment, receiving the call at a voicemail system can include receiving the call at a plain old voicemail system. In another embodiment, receiving the call at a voicemail system can include receiving the call at a visual voicemail system. In yet another embodiment, receiving the call at a voicemail system can include receiving the call at a voicemail application stored in a memory of a user device.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
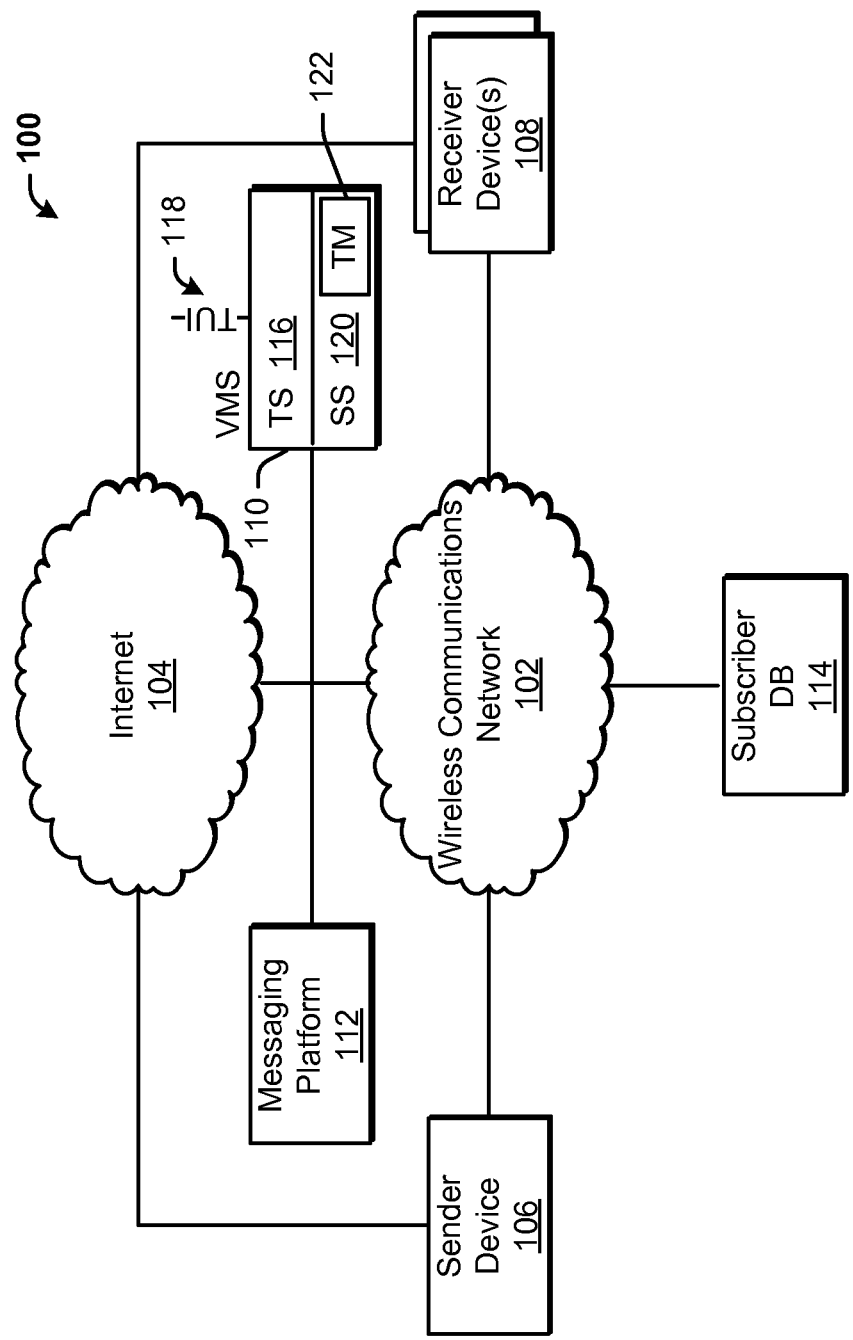
FIG. 1 schematically illustrates a communications network in which embodiments of the present disclosure can be implemented.

Referring to the drawings wherein like numerals represent like elements throughout the several views, FIG. 1 illustrates an exemplary network system 100 for implementing various aspects of the present disclosure. The illustrated network system 100 includes a wireless communications network 102 that is in communication with the Internet 104.

By way of example, the wireless communications network 102 can be configured as a 2G GSM (Global System for Mobile communications) network and provide data communications via GPRS (General Packet Radio Service), and EDGE (Enhanced Data rates for GSM Evolution). By way of further example, the wireless communications network 100 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 102 is also compatible with future mobile communications standards including, but not limited to, pre-4G and 4G standards, for example. Moreover, the wireless communications network 102 can be configured for providing messaging services via Short Message Service (SMS), Multimedia Message Service (MMS), instant messaging, and voicemail messaging including plain old voicemail (POVM) and visual voicemail (VVM). As such, embodiments are described herein in context of one or more of these messaging technologies.

The wireless communications network 102 can include radio access network (RAN) components and core network components for circuit-switched and packet-switched communications. Advanced architectures, such as Internet Protocol Multimedia Subsystem (IMS) are also contemplated. SMS over IP and MMS over IP are also contemplated The wireless communications network 102 is illustrated as being in communication with a sender device 106. The sender device 106 can be any device capable of communication with one or both of the wireless communications network 102 and the Internet 104. For example, the sender device 106 can be a cellular telephone, a Wi-Fi telephone, a VoIP telephone with messaging capabilities, a dual or multi-mode telephone, a computer, a personal digital assistant, a handheld computer, a gaming system, and the like. The sender device 106 can be operated by a calling party, that is, the user of the sender device 106.

The sender device 106 can communicate with one or more receiver devices 108 via at least one of the wireless communications network 102 and the Internet 104. The sender device 106 can communicate with a voicemail system (VMS) 110 to manage a voicemail account associated with the calling party. The VMS 110 can be a plain old voicemail system (POVMS) and/or a visual voicemail system (VVMS). Furthermore, the calling party can be prompted to record a message for a called party, operating one of the receiver devices 108, if the called party is unavailable. The receiver device 108 can be any device capable of communication with one or both of the wireless communications network 102 and the Internet 104. For example, the receiver device 108 can be a cellular telephone, a Wi-Fi telephone, a VoIP telephone with messaging capabilities, a dual or multi-mode telephone, a computer, a personal digital assistant, a handheld computer, a gaming system, and the like.

The network system 100 is illustrated as further including a VMS 110, a messaging platform 112, and a subscriber database 114. The VMS 110 can include a telephony server (TS) 116 for handling incoming voicemail inquiries via a telephone user interface (TUI) 118, a storage server (SS) 120 for storing and managing voicemail messages for a plurality of voicemail accounts, and a translation module 122 for translating voicemail messages from a first language into at least one other language.

The messaging platform 112 can provide SMS, MMS, instant messaging, and like messaging features in accordance with the various embodiments described herein. Accordingly, the messaging platform 112 can include one or more Short Message Service Centers (SMSCs), a Multimedia Message Service Centers (MMSCs), and instant messaging servers, for example. The messaging platform 112 can operate using messaging protocols including, but not limited to, Short Message Peer-to-Peer (SMPP), OSCAR protocol, Session Initiation Protocol (SIP), SIMPLE, and like protocols.

The subscriber database 114 can be configured to store and manage subscriber data, such as, for example, language preference information, account information, billing information, services information, equipment information, International Mobile Subscriber Identity (IMSI), International Mobile Equipment Identity (IMEI), location information, combinations thereof, and the like. In addition or alternatively, the subscriber database 114 can be configured as a location register, such as Home Location Register (HLR). The HLR can be configured to provide routing information for mobile-terminated calls, SMS messages, MMS messages, and the like.

To avoid complicating the disclosure, the following description will describe, in general terms, performance of various methods and GUIs embodying various concepts of the disclosure. In reading the description of the several methods and GUIs herein, it should be understood that a user can interact with the VMS 110 using a TUI 118, a GUI, or another UI, such as a web UI, for example. Alternatively, a user can interact with a device 106, 108 and the device 106, 108 can handle all communication needed to instruct the VMS 110 how to carry out the user's desired actions. Therefore, DMTF-driven TUIs, icon-based GUIs, touch-sensitive screen GUIs, voice-driven TUIs, and the like are included in the following description and are included in the scope of the appended claims. Moreover, it should be understood that a user can interact with the messaging platform 112 using a GUI or another UI to instruct the messaging platform 112 how to carry out the user's desired actions and/or to create a message to be handled by the messaging platform 112. Several exemplary methods are described with reference to FIGS. 2-5 and GUI implementations of several exemplary embodiments of the present disclosure are described with reference to FIGS. 7-11.

Figure 2:
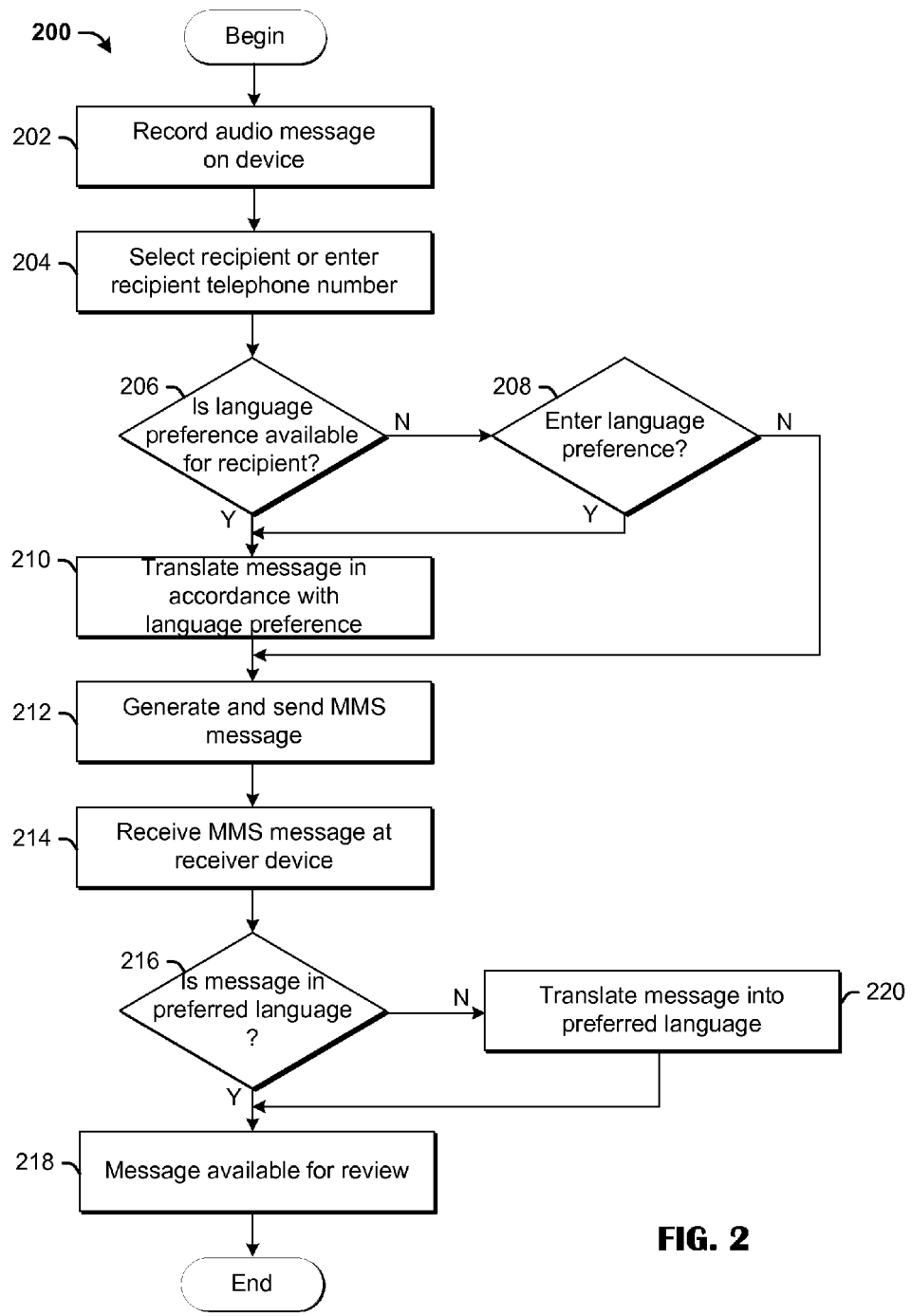
FIG. 2 schematically illustrates a method for enhanced multimedia messaging including a language translation feature, according to an exemplary embodiment of the present disclosure.

Referring now to FIG. 2, a method 200 for enhanced multimedia messaging including a language translation feature is illustrated, according to an exemplary embodiment of the present disclosure. It should be understood that the steps of the method 200 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 200 can be ended at any time. Some or all steps of this process, and/or substantially equivalent steps, can be performed by execution of computer-readable instructions included on a computer readable medium.

The method 200 begins and flow proceeds to block 202 wherein a calling party can record an audio message on the sender device 106. It is contemplated that an application stored on the sender device 106 can include functionality to begin recording, end recording, save a recording, delete a recording, and append a recorded audio message to an MMS message. An audio message as described herein can include audio data recorded via a microphone on the sender device 106. The audio data can be, but is not limited to, voice data, music data, and other audio data, such as ambient noise, or any combination thereof, for example. Further, the audio data can be in any format. Audio data exemplary formats include, but are not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4), Windows® media audio (WMA), RealAudio (RA), free lossless audio codec (FLAC), Apple® lossless encoder (ALE), i.e., Apple® lossless audio codec (ALAC), and other open and proprietary audio formats.

Prior to recording the audio message or at a time thereafter, the calling party can select one or more recipients from a contact list stored locally on the sender device 106 or retrieved via a network device in the wireless communications network 102 or the Internet 104, as illustrated in block 204. Alternatively, the calling party can enter a telephone number for each of the one or more recipients.

At block 206, a determination is made as to whether a language preference is available for each of the one or more recipients identified at block 204. In one embodiment, the calling party can set at least one preferred language for each of the recipients. In another embodiment, the language preference can be retrieved from a language preference set for a recipient in a contact list. In another embodiment, a language preference can be included in an electronic business card, such as a vCard, for example. In yet another embodiment, a language preference can be derived from the country code of a MSISDN.

If it is determined, at block 206, that a language preference is not available for a recipient, the calling party can be prompted to enter a language preference, at block 208. If the calling party enters a language preference, at block 208, flow proceeds to block 210 wherein the audio message can be translated in accordance with the language preference specified at block 208. If it is determined, at block 206, that a language preference is available for a recipient, the audio message can be translated in accordance with the language preference at block 210. If the calling party elects not to enter a language preference at block 208, the MMS message can be sent without being translated in accordance with a language preference. In this case, the receiver device 108 can be configured to translate the audio message in accordance with a language preference stored on the receiver device 108, for example. In some embodiments, a language preference can be overridden by one of the calling party and the called party.

At block 212, the sender device 106 can generate an MMS message and send the MMS message including the attached audio message to each recipient identified at block 204. At block 214, the MMS message can be received at the receiver device(s) 108. At block 216, a determination is made as to whether the message is in the preferred language of the called party as determined by the language preference on the receiver device 108. Assuming the audio message is in the preferred language, flow proceeds to block 218 and the audio message is made available to the called party. The method 200 can end. If the audio message is not in the preferred language, however, flow proceeds to block 220 and the audio message can be translated into the preferred language in accordance with the language preference set on the receiver device 108. The method 200 can then continue to block 218 wherein the audio message is made available to the called party. The method 200 can end.

The aforementioned method 200 can be modified such that the receiver device 108 translates the audio message. In this alternative embodiment, a language preference can be sent with the message. The message can be translated at the receiver device 108 in accordance with the language preference. The language preference can be included as a text portion of the MMS message. For example, a special character string can identify the text portion as a language preference and the receiver device 108 can be configured to recognize the special character string and use the language preference specified therein. In another alternative embodiment, the receiver device 108 can include a local language preference that can be used to translate an audio message.

In another embodiment, the aforementioned method 200 can be modified such that the audio message recorded on the sender device 106 can be sent in an MMS message to the VMS 110 and stored in a voicemail account associated with the recipient. Translation of the message can occur at the sender device 106 and/or at the translation module 122.

Figure 3:
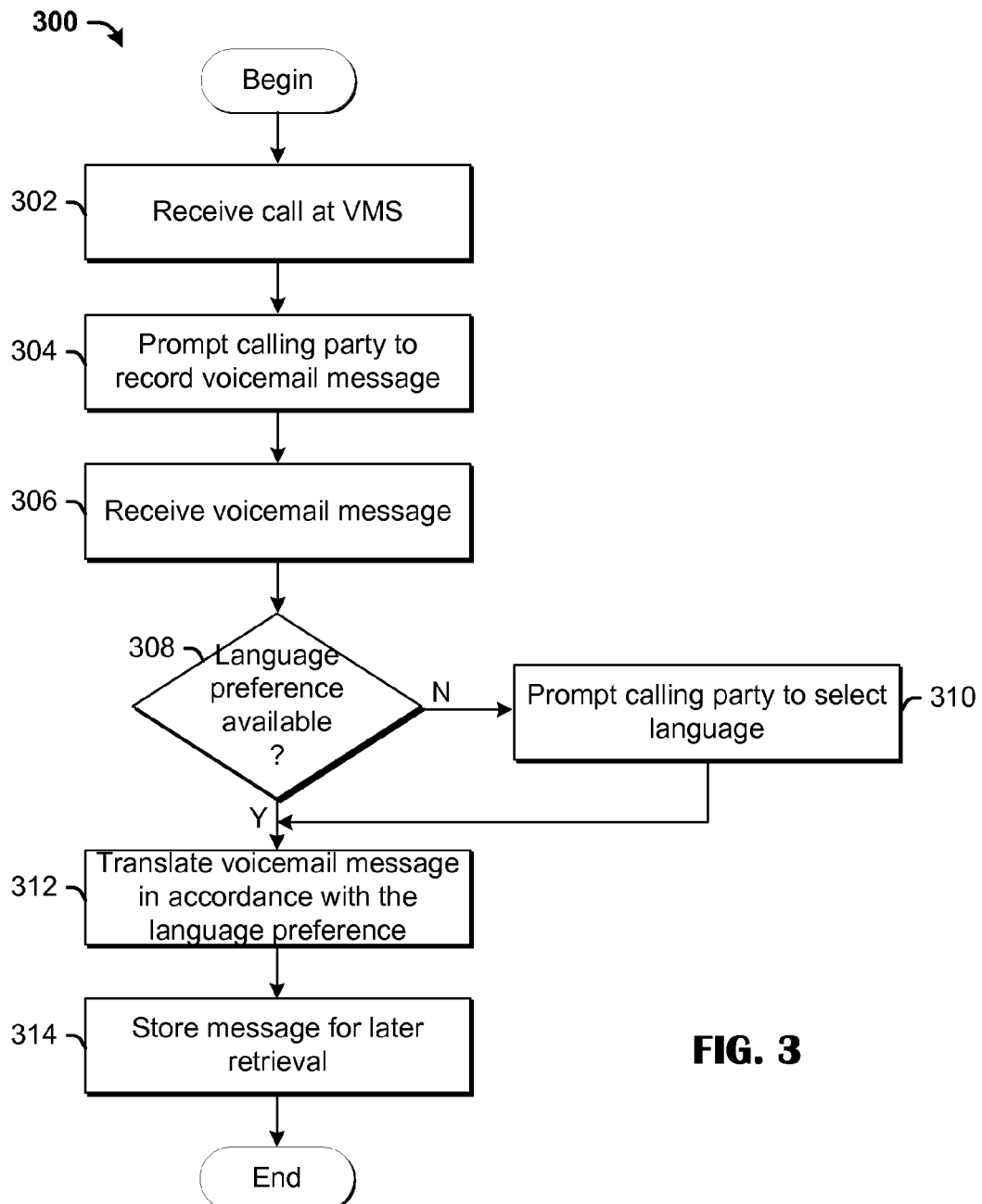
FIG. 3 schematically illustrates a method for operating a voicemail system that supports enhanced voicemail messaging including a language translation feature, according to an exemplary embodiment of the present disclosure.

Referring now to FIG. 3, a method 300 for operating a voicemail system that supports enhanced voicemail messaging including a language translation feature is illustrated, according to an exemplary embodiment of the present disclosure. It should be understood that the steps of the method 300 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. Some or all steps of this process, and/or substantially equivalent steps, can be performed by execution of computer-readable instructions included on a computer readable medium.

The method 300 begins and flow proceeds to block 302 wherein a call is received at the VMS 110. At block 304, the VMS 110 can prompt the calling party to record a voicemail message. It is contemplated that one or more greetings can be presented to the calling party prior to prompt the calling party to record a voicemail message. At block 306, the calling party can record a voicemail message and the recorded voicemail message can be stored in the SS 120. Flow then proceeds to block 308 wherein a determination is made as to whether a language preference is available for the called party. For example, the called party can select a language preference when setting up a voicemail account or at a time thereafter by accessing the voicemail system via the TUI 118, a GUI on the receiver device 108, and/or via a web UI. An exemplary GUI illustrating this concept is provided in FIG. 8.

If it is determined, at block 308, that a language preference is not available, flow proceeds to block 310 and the calling party can be prompted to select or enter a language. In addition, an option to skip a language selection can be provided. After at least one language is selected, at block 310, or if a language preference is available, at block 308, flow proceeds to block 312. At block 312, the voicemail message can be sent to the translation module 122 whereat the voicemail message can be translated in accordance with the language preference.

At block 314, the translated message can be stored for later retrieval by the called party. The method 300 can end.

The aforementioned method 300 can be modified such that the voicemail system is a visual voicemail application stored in a memory of a receiver device 108. Accordingly, the visual voicemail application can perform a language translation in accordance with a language preference set by the calling party or a language preference set by the called party in a language preference option.

Figure 4:
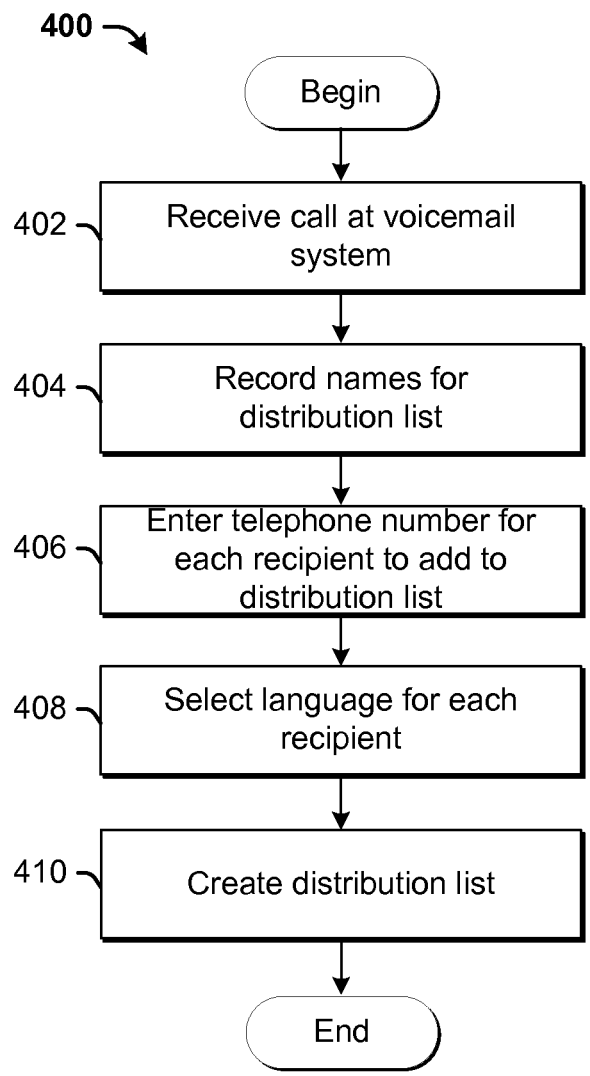
FIG. 4 schematically illustrates a method for operating a voicemail system to create a distribution list for enhanced voicemail messaging including a language translation feature, according to an exemplary embodiment of the present disclosure.

Referring now to FIG. 4, a method 400 for operating a voicemail system to create a distribution list for enhanced voicemail messaging including a language translation feature is illustrated, according to an exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

The method 400 begins and flow proceeds to block 402 wherein a call is received at the VMS 110. The calling party can be directed to a voicemail account associated with the calling party. The calling party can be provided with a variety of options to manage the voicemail account including, but not limited to, setting a voicemail password, changing a voicemail password, recording a greeting, recording a name, listening to new messages, listening to saved messages, deleting messages, creating a voicemail distribution list, and sending a voicemail message via a distribution list. The method 400 is directed to the creation of a distribution list and as such it is assumed that the option to create a voicemail distribution list is selected.

At block 404, the calling party can be prompted to speak the names of the recipients for the distribution list and the names can be recorded. Alternatively, the names can be entered on a keypad or on-screen keyboard on the device 106. Alternatively, contacts can be selected from a local or global contact list. Flow then proceeds to block 406 wherein the calling party is prompted to enter a telephone number for each recipient to add to the distribution list. At block 408, the calling party can be provided the option to select or enter at least one language for each recipient. At block 410, a distribution list can be created with the recipients and designated language preferences. The method 400 can end.

The aforementioned method 400 can be modified such that the voicemail system is a visual voicemail application stored in a memory of a sender device 106. Accordingly, the visual voicemail application can provide a GUI by which the calling party can create a distribution list, populate the list with one or more recipients, and specify at least one language preference for each recipient.

Figure 5:
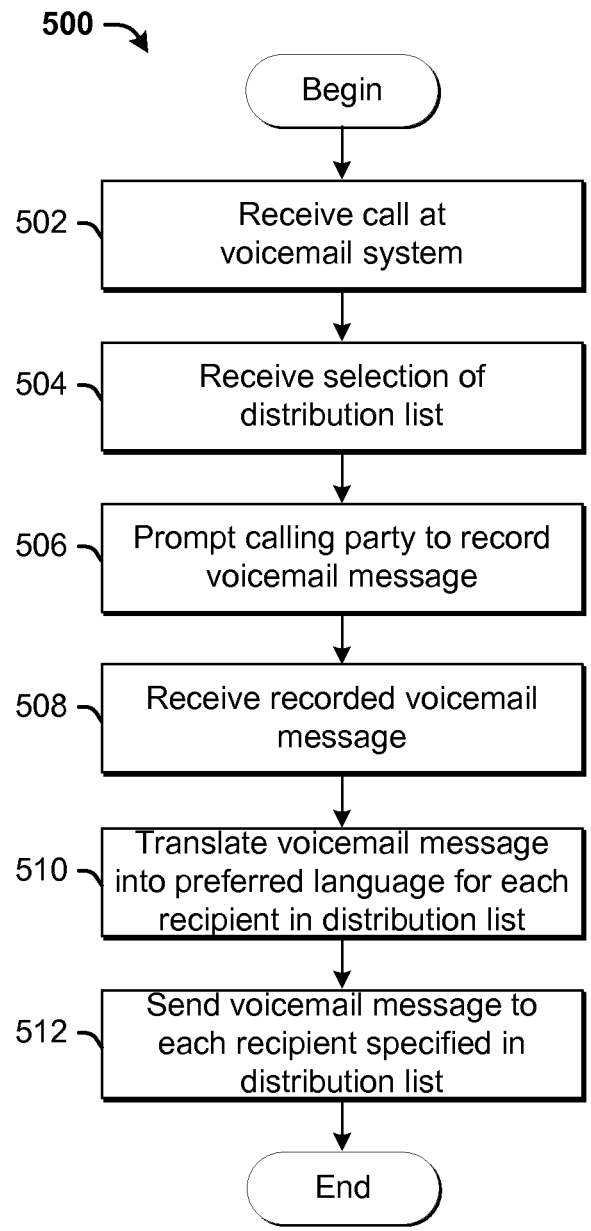
FIG. 5 schematically illustrates a method for operating a voicemail system to send an enhanced voicemail message including a language translation feature via a distribution list, according to an exemplary embodiment of the present disclosure.

Referring now to FIG. 5, a method 500 for operating a voicemail system to send an enhanced voicemail message including a language translation feature via a distribution list is illustrated, according to an exemplary embodiment of the present disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/ or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium.

The method 500 begins and flow proceeds to block 502 wherein a call is received at the VMS 110. The calling party can be directed to a voicemail account associated with the calling party. The calling party can be provided with a variety of options to manage the voicemail account including, but not limited to, setting a voicemail password, changing a voicemail password, recording a greeting, listening to new messages, listening to saved messages, deleting messages, creating a voicemail distribution list, and sending a voicemail message via a distribution list. The method 500 is directed to sending a voicemail message via a distribution list and as such an option is selected, at block 504, to send a voicemail message via a voicemail distribution list.

At block 506, the calling party is prompted to record a voicemail message and the voicemail message is recorded at block 508. At block 510, the voicemail message can be translated into the preferred language set for each of the recipients in the distribution list. At block 512, the voicemail message can be sent to each recipient specified in the distribution list. The method 500 can end.

The aforementioned method 500 can be modified such that the voicemail system is a visual voicemail application stored in a memory of a sender device 106. Accordingly, the visual voicemail application can provide a GUI by which the calling party can select a previously created distribution list, record a voicemail message on the sender device 106, translate the voicemail message into the preferred language set for one or more of the recipients in the distribution list, and send the voicemail message to each recipient specified in the distribution list. In one embodiment, the voicemail message can be sent from the sender device 106 to the VMS 110 as an MMS message.

Figure 6:
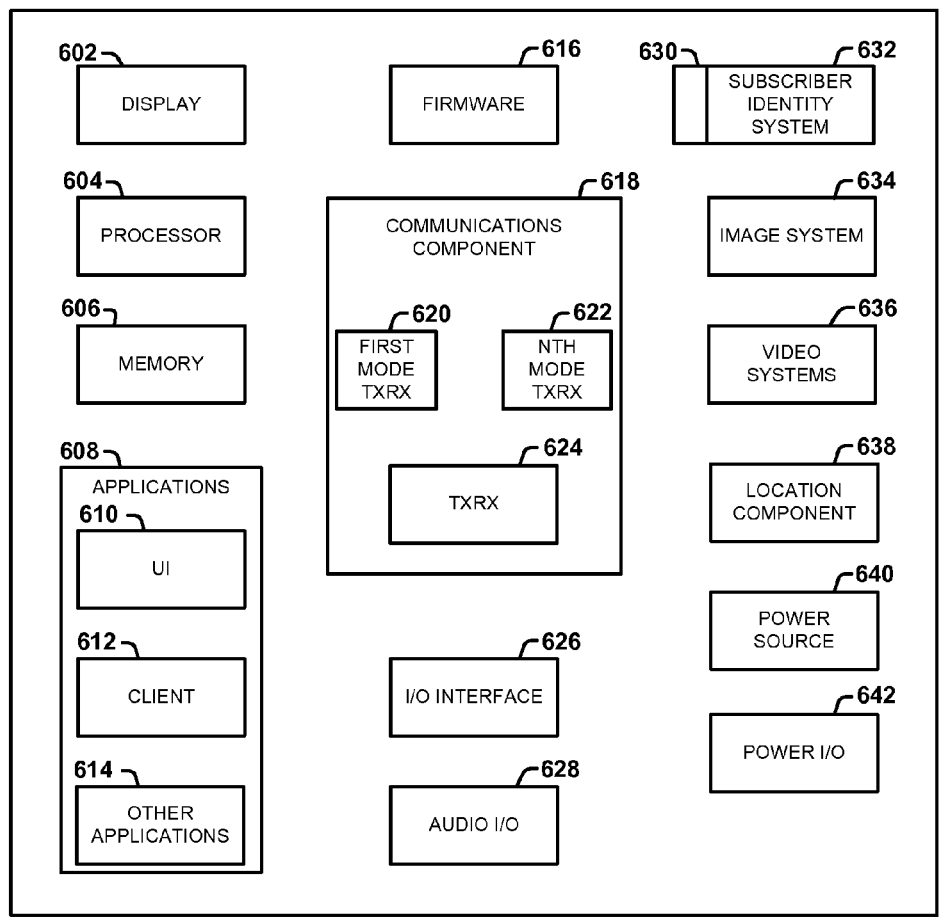
FIG. 6 schematically illustrates an exemplary mobile device and components thereof, according to an embodiment of the present disclosure.

FIG. 6 is a schematic block diagram illustrating an exemplary mobile device 600 for use in accordance with an exemplary embodiment of the present disclosure. The mobile device 600 is an exemplary mobile device that can be representative of the sender device 106 and/or a receiver device 108. As such, the remaining description is described with reference to a device 600, which can be interpreted to mean at least one of the sender device 106 and a receiver device 108 depending upon the context. Although no connections are shown between the components illustrated and described in FIG. 6, the components can interact with each other to carry out device functions.

As illustrated, the mobile device 600 can be a multimode handset. FIG. 6 and the following discussion are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 600 includes a display 602 for displaying multimedia such as, for example, text, images, video, and telephony functions, such as, visual voicemail data, caller line ID data, setup functions, menus, music metadata, messages, wallpaper, graphics, and the like.

The device 600 can include a processor 604 for controlling, and/or processing data. A memory 606 can interface with the processor 604 for the storage of data and/or applications 608. The memory 606 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 600.

The memory 606 can be configured to store one or more applications 608. The applications 608 can also include a user interface (UI) application 610. The UI application 610 can interface with a client 612 (e.g., an operating system) to facilitate user interaction with device functionality and data, for example, recording audio messages, creating voicemail distribution lists, sending recorded audio messages, setting language preferences, translating audio messages, video message, and/or text messages, answering/initiating calls, entering/deleting data, configuring settings, address book manipulation, multimode interaction, and the like. The applications 608 can include other applications 614 such as, for example, a visual voicemail application, a language preference application, a translation application, a recording application, an audio processing application, a distribution list application, add-ons, plug-ins, a voice recognition application, a call voice processing application, an MMS messaging application, an SMS messaging application, an e-mail messaging application, a video processing application, an image processing application, a music application, combinations thereof, and the like, as well as subsystems and/or components. The applications 608 can be stored in the memory 606 and/or in a firmware 616, and can be executed by the processor 604. The firmware 616 can also store code for execution during initialization of the device 600.

A communications component 618 can interface with the processor 604 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 618 can also include a multimode communications subsystem for providing cellular communications via different cellular technologies. For example, a first cellular transceiver 620 can operate in one mode, for example, GSM, and an Nth transceiver 622 can operate in a different mode, for example WiFi. While only two transceivers 620, 622 are illustrated, it should be appreciated that a plurality of transceivers can be included. The communications component 618 can also include a transceiver 624 for unlicensed RF communications using technology such as, for example, WiFi, WiMAX, NFC, other RF and the like. The transceiver 624 can also be configured for line-of-sight technologies, such as, for example, infrared and IRDA. Although a single transceiver 624 is illustrated multiple transceivers for unlicensed RF and line-of-sight technologies are contemplated.

The communications component 618 can also facilitate communications reception from terrestrial radio networks, digital satellite radio networks, Internet-based radio services networks, combinations thereof, and the like. The communications component 618 can process data from a network, such as, for example, the Internet, a corporate intranet, a home broadband network, and the like, via an ISP, DSL provider, or other broadband service provider.

An input/output (I/O) interface 626 can be provided for input/output of data and/or signals. The I/O interface 626 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 628 that can include a speaker (not shown) for the output of audio signals and a microphone (not shown) to collect audio signals.

The device 600 can include a slot interface 630 for accommodating a subscriber identity system 632, such as, for example, a SIM or universal SIM (USIM). The subscriber identity system 632 instead can be manufactured into the device 600, thereby obviating the need for a slot interface 630.

The device 600 can include an image capture and processing system 634. Photos and/or videos can be obtained via an associated image capture subsystem of the image system 634, for example, a camera. The device 600 can also include a video systems component 636 for processing, recording, and/or transmitting video content.

A location component 638 can be included to send and/or receive signals, such as, for example, GPS data, assisted GPS data, triangulation data, combinations thereof, and the like. The device 600 can use the received data to identify its location or can transmit data used by other devices to determine the device 600 location.

The device 600 can include a power source 640 such as batteries and/or other power subsystem (AC or DC). The power source 640 can be single-use, continuous, or rechargeable. In the case of the latter, the power source 640 can interface with an external power system or charging equipment via a power I/O component 642.

Figure 7:
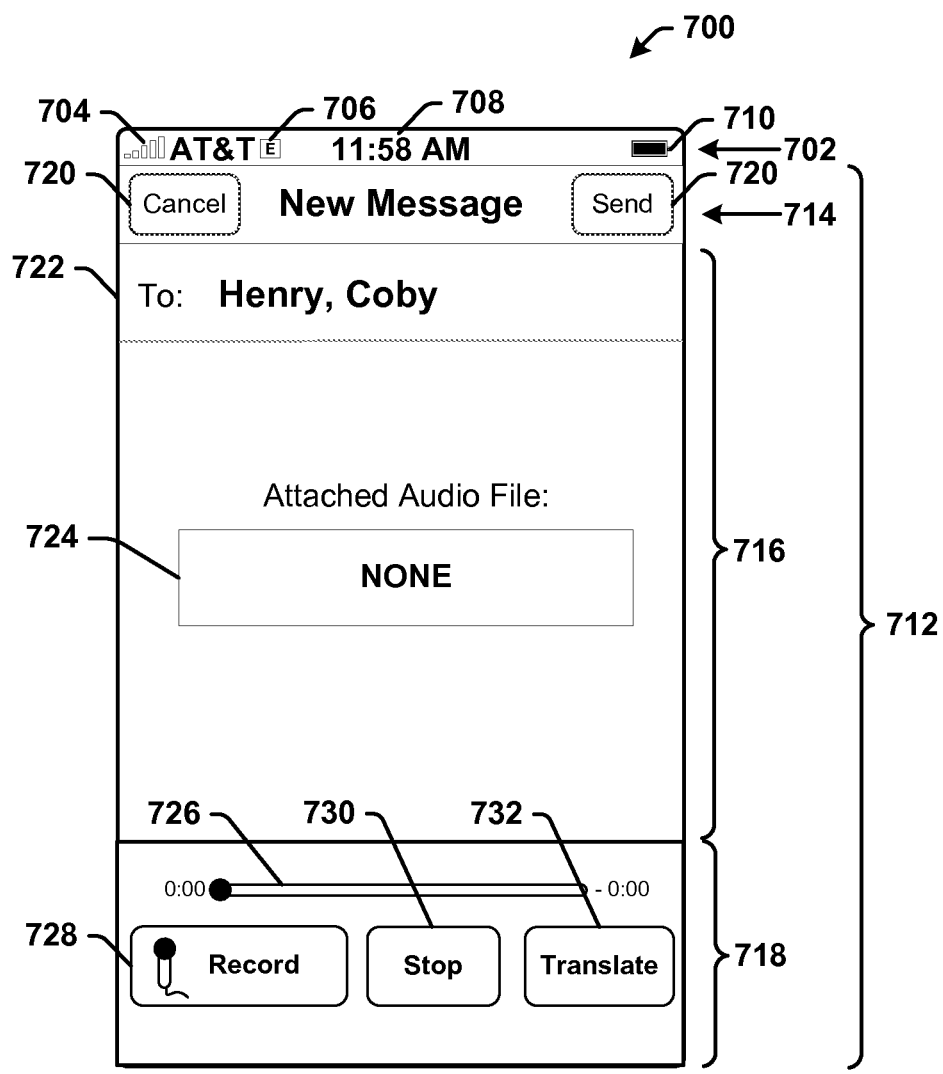
FIG. 7 illustrates an exemplary graphical user interface (GUI) of an enhanced multimedia messaging application including a language translation feature, according to an exemplary embodiment of the present disclosure.

Referring now to FIG. 7, an exemplary GUI 700 of an enhanced multimedia messaging application including a language translation feature is illustrated, according to an exemplary embodiment of the present disclosure. The illustrated GUI 700 can include operational information 702 for a device 600. The operational information 702 can include network information, for example, a signal meter 704 for displaying the measured strength of a network signal, and a network indicator 706 for displaying the current network to which the device 600 is connected. In the illustrated GUI 700, the device 600 is indicating a maximum signal strength and that the device 600 is currently connected to the AT&T EDGE network. It should be understood that this indication is exemplary only. The GUI 700 can be used on devices operating on other networks and operated by other carriers. The operational information 702 can also include, for example, the time of day 708, a battery meter 710, as well as other indicators, including, but not limited to, a short range radio communications indicator, an alarm indicator, a date, and the like.

In the illustrated GUI 700, an exemplary user interface portion 712 includes a title and menu portion 714, a message portion 716, and a control portion 718. As illustrated, the title and menu portion 714 can include one or more options 720, though the illustrated options are merely exemplary. The message portion 716 can include a recipient field 722 through which a user can select one or more recipients to receive a message and an audio file field 724 through which a user can attach an audio file, such as an audio file recorded via the control portion 718, for example. The control portion 718 can include a time slider bar 726, a record option 728, a stop recording option 730, and a translate option 732. The record option 728 can be used to initiate a recording session during which a user can dictate a message and the message can be recorded on the device 600. The user can select the stop recording option 730 to stop recording. A recorded message can be translated via the translate option 732. It is contemplated that the translate option 732 can be configured to automatically translate a recorded audio message in accordance with a language preference set for the recipient(s) in the recipient field 722. Alternatively, the translate option 732 can prompt the user to enter or select a translation language. It is further contemplated that an audio file can be a previously saved audio file, for example, an archived voicemail message or voice message.

Figure 8:
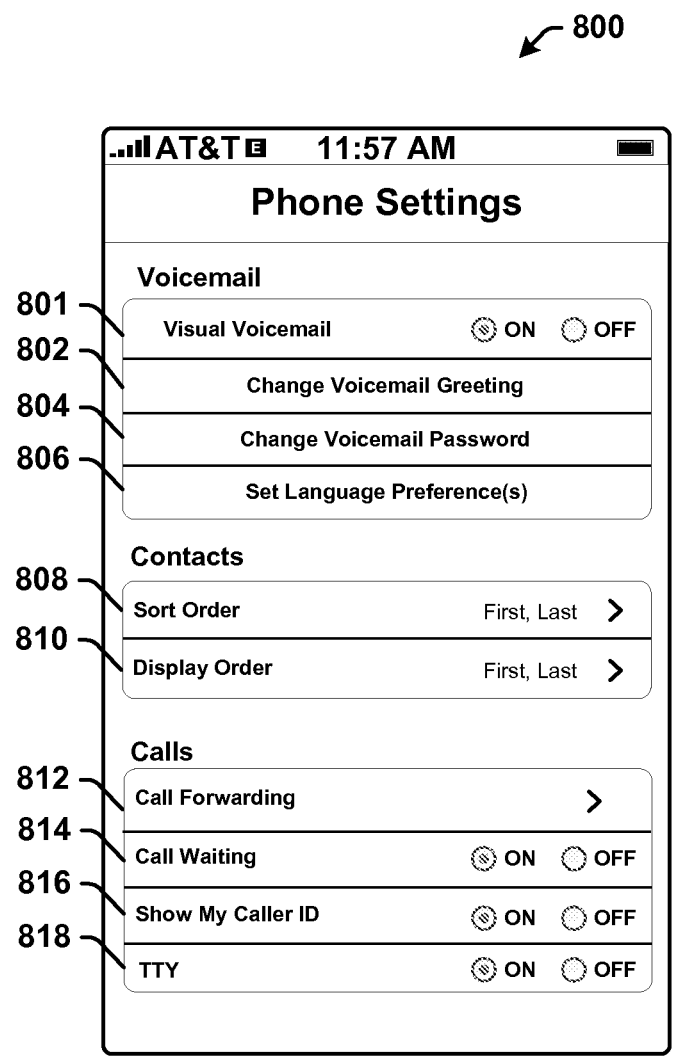
FIG. 8 illustrates an exemplary GUI menu for providing an option to set a language preference, according to an exemplary embodiment of the present disclosure.

Referring now to FIG. 8, an exemplary GUI 800 for providing an option to set a language preference, according to an exemplary embodiment of the present disclosure. The GUI 800 can include a visual voicemail toggle option 801, a change voicemail greeting option 802, a change voicemail password option 804, and a set language preference option 806. The visual voicemail toggle option 801 allows a user to toggle VVM on and off. For example, a user may desire to turn VVM off when roaming internationally due to possible high costs associated with international data roaming. The change voicemail greeting option 802 can allow the user to change a voicemail greeting on the device 600. The change voicemail password option 804 can allow the user to change the voicemail password associated with their VVM service on the device 800. The set language preference option 806 can allow the user to set one or more language preferences for visual voicemail and/or plain old voicemail messages. As such, when a visual voicemail message is received at the device 600, the message can be automatically translated into the language specified in the set language preference option 806. The user can be prompted to confirm the automatic translation. For devices that are not enabled or not compatible with visual voicemail, the language specified in the set language preference option 806 can be sent to the VMS 110 and the user's voicemail account can be updated.

The illustrated GUI 800 also includes a sort order option 808 whereby the user can select the order by which contacts are sorted, and a display order option 810 whereby the user can select the order by which contacts are displayed. The illustrated GUI 800 further includes a call forwarding option 812 whereby the user can select at least one call forwarding number, a call waiting option 814 whereby the user can enable/disable a call waiting feature, a "show my caller ID" option 816 whereby the user can enable/disable a caller ID feature, and a TTY option 818 whereby the user can enable/disable a TTY feature.

Figure 9:
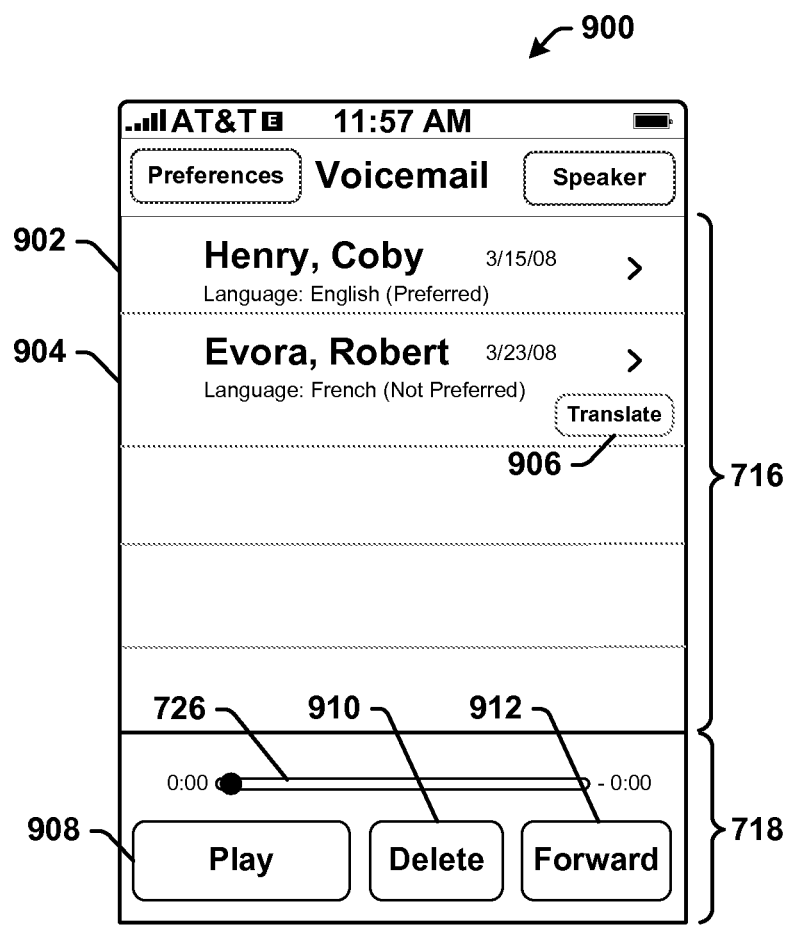
FIG. 9 illustrates an exemplary GUI of an enhanced visual voicemail message application including language translation option, according to an exemplary embodiment of the present disclosure.

Referring now to FIG. 9, an exemplary GUI 900 of an enhanced visual voicemail message application including a language translation option is illustrated, according to an exemplary embodiment of the present disclosure. As illustrated, the message portion 716 can include a first message field 902 and a second message field 904. Each illustrated message field 902, 904 includes a name of the calling party, the date on which the called party left the message, and the language of the message, though additional or alternative information relating to the message is possible, and is contemplated. Further, each field 902, 904 can include an indication as to whether the language is a preferred language as determined by a language preference set, for example, via the set language preference option 806 of FIG. 8, for example. A translate option 906 can be provided if the language of the message is not a preferred language. Upon selection, the translate option 906 can automatically translate the voicemail message into at least one preferred language. Alternatively, selection of the translate option 906 can prompt the user to select or enter a translation language. Messages received in a preferred language can also be translated to at least one additional language via a similar translate option. A voicemail message can be temporarily saved or archived in at least one language. The aforementioned embodiments are directed to visual voicemail messages; however, these embodiments are extensible to other messaging applications, such as MMS, SMS and web-based messaging applications, for example.

The illustrated GUI 900 further includes a play option 908, a delete message option 910, and a forward message option 912. The play option 908 can be used to manipulate a playback of a selected message. The delete message option 910 can be used to delete a selected message. The forward message option 912 can be used to forward a message to another mobile device, a computer, a messaging platform 112, a VMS 110, or to any other device or system local to the device 600 or available via a network connection, for example. In one embodiment, a message can be received by the mobile device 600 in a first language and translated into a second language as specified in a language preference. The message can be forwarded in the first language, forwarded in the second language, or forwarded in a third language of the selected forwarding recipient.

Figure 10:
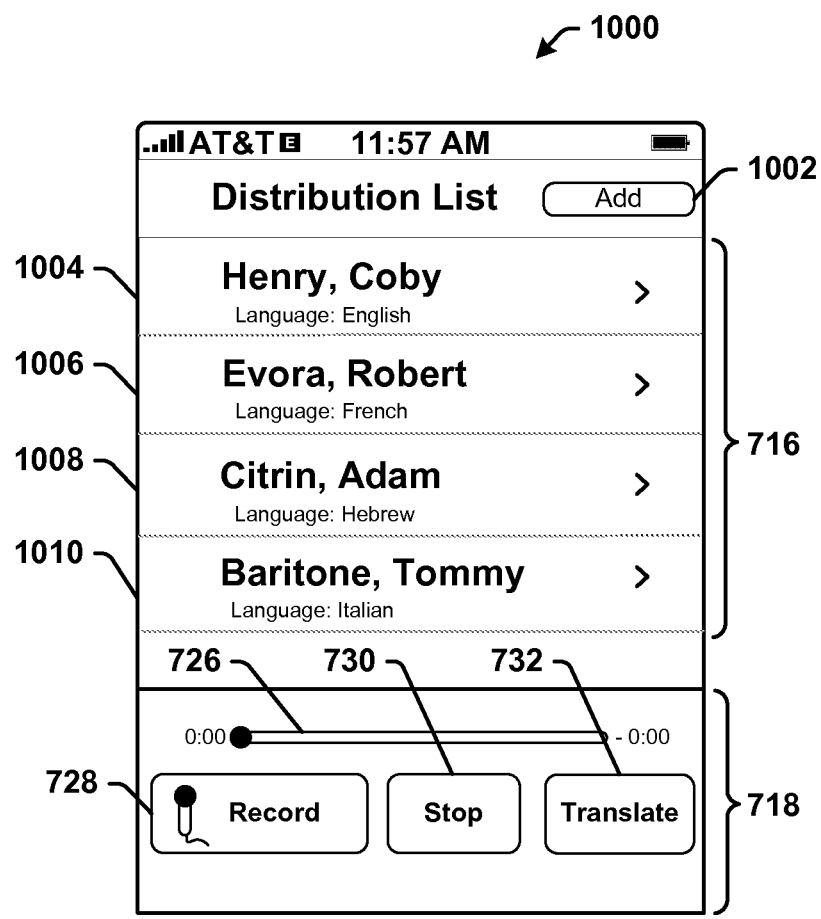
FIG. 10 illustrates an exemplary GUI of an enhanced visual voicemail message application for creating a visual voicemail distribution list including a language translation feature, according to an exemplary embodiment of the present disclosure.

Referring now to FIG. 10, an exemplary GUI 1000 of an enhanced visual voicemail message application for creating a visual voicemail distribution list including a language translation feature is illustrated, according to an exemplary embodiment of the present disclosure. The illustrated GUI 1000 includes an add recipient option 1002 by which a user can add a new recipient to a distribution list. The message portion 716 is populated with recipient fields 1004, 1006, 1008, 1010, each including a language preference for the indicated recipient. The language preference can be used for a language translation prior to sending the message to each recipient or can be used by the recipient's device to translate the message at the receiver device 108. The control portion 718 can include a time slider bar 726, a record option 728, a stop recording option 730, and a translate option 732. The record option 728 can be used to initiate a recording session during which a user can record an audio message. The user can select the stop recording option 730 to stop recording. A recorded message can be translated via the translate option 732. The translate option 732 can be configured to automatically translate a recorded audio message in accordance with a language preference set for the recipient(s) in the recipient field 1004, 1006, 1008, 1010. Alternatively, the translate option 732 can prompt the user to enter or select a translation language. An audio file can be a previously saved audio file, for example, an archived voicemail message or voice message.

Figure 11:
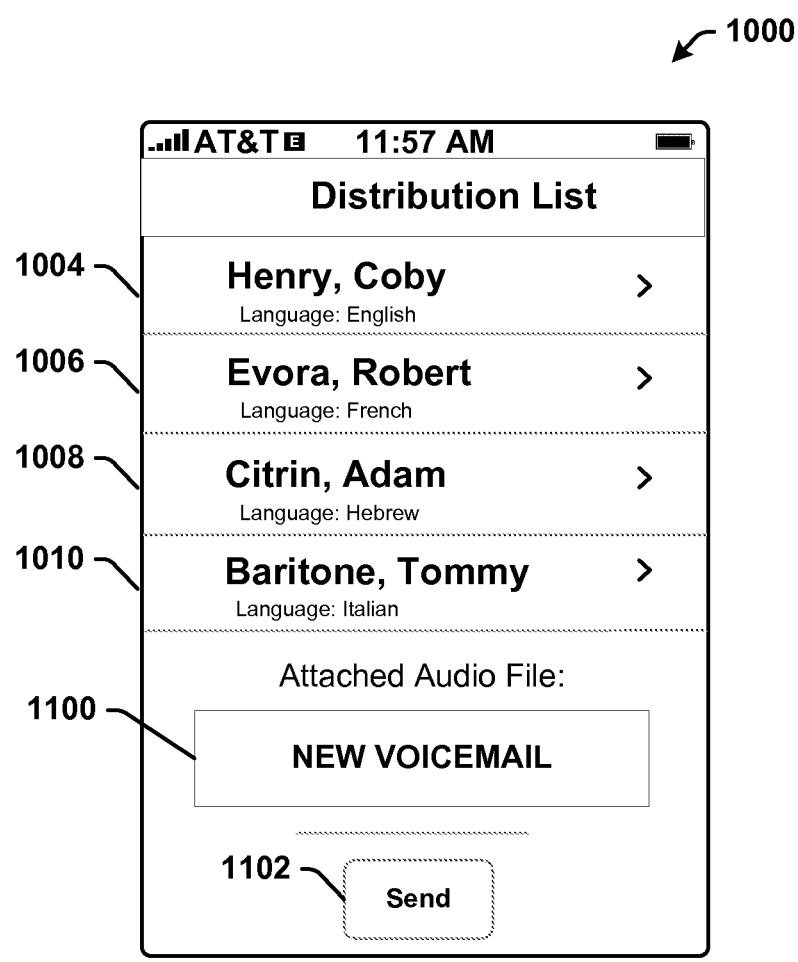
FIG. 11 illustrates an exemplary GUI of an enhanced visual voicemail message application for sending a voicemail to members of a visual voicemail distribution list including a language translation feature, according to an exemplary embodiment of the present disclosure.

Referring now to FIG. 11, an exemplary GUI 1000 of an enhanced visual voicemail message application for sending a voicemail to members of a visual voicemail distribution list including a language translation feature is illustrated, according to an exemplary embodiment of the present disclosure. The illustrated GUI 1000 includes the message portion 716 populated with recipient fields 1004, 1006, 1008, 1010, each including a language preference for the indicated recipient. The illustrated GUI 1000 also includes an attached audio file 1100 and a send option 1102. The attached audio file 1100 can be a voicemail message recorded via the controls available in the control portion 718 illustrated in FIG. 10, for example. The send option 1102 can become available when an audio file is attached and can be used to send the attached audio file to the recipients identified in the recipient fields 1004, 1006, 1008, 1010.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for operating a voicemail system, comprising:
receiving a call for a called party at the voicemail system, the voicemail system comprising a stored language preference for the called party;
prompting a calling party to leave a message;
creating the message;
providing a plurality of calling-party-selected language preferences;
prompting the calling party to select, from the plurality of calling-party-selected language preferences, a calling-party-selected language preference for the message;
in response to prompting the calling party to select, from the plurality of calling-party-selected language preferences, the calling-party-selected language preference for the message, receiving the calling-party-selected language preference for the message;
overriding the stored language preference for the called party with the calling-party-selected language preference;
determining whether the message is in the calling-party-selected language preference; and
in response to overriding the stored language preference with the calling-party-selected language preference, and if the message is not in the calling-party-selected preferred language identified by the language preference, translating the message into a preferred language of the calling-party-selected preferred language preference, thereby creating a translated message.

2. The method of claim 1, wherein receiving the call at the voicemail system is performed at a network voicemail system comprising a plain old voicemail system.

3. The method of claim 1, wherein receiving the call at the voicemail system is performed at a network voicemail system comprising a visual voicemail system.

4. The method of claim 1, wherein receiving the call at the voicemail system comprises receiving the call at a voice mail application stored in a memory of a user device.

5. The method of claim 1, wherein creating the message comprises creating the message having a message type selected from a group of message types consisting of:
a video message;
a text message; and
a voicemail message.

6. The method of claim 1, wherein overriding the stored language preference for the called party with the calling-party-selected language preference comprises overriding the stored language preference for the called party with the calling-party-selected language preference in response to a trigger initiated by the calling party to perform the override.

7. The method of claim 1, wherein overriding the stored language preference for the called party with the calling-party-selected language preference comprises overriding the stored language preference for the called party with the calling-party-selected language preference in response to a trigger initiated by the called party to perform the override.

8. A voicemail system comprising:
a tangible computer processor; and
a non-transitory computer-readable medium having instructions that, when executed by the processor, cause the processor to perform operations comprising
receiving a call for a called party at the voicemail system, the voicemail system comprising a stored language preference for the called party,
prompting a calling party to leave a message,
creating the message,
providing a plurality of calling-party-selected language preferences;
prompting the calling party to select, from the plurality of calling-party-selected language preferences, a calling-party-selected language preference for the message,
in response to prompting the calling party to select, from the plurality of calling-party-selected language preferences, the calling-party-selected language preference for the message, receiving the calling-party-selected language preference for the message,
overriding the stored language preference for the called party with the calling-party-selected language preference,
determining whether the message is in the calling-party-selected language preference, and
in response to overriding the stored language preference with the calling-party-selected language preference, and if the message is not in the calling-party-selected preferred language identified by the language preference, translating the message into a preferred language of the calling-party-selected preferred language preference, thereby creating a translated message.

9. The voicemail system of claim 8, wherein the voicemail system comprises a plain old voicemail system.

10. The voicemail system of claim 8, wherein the voicemail system comprises a visual voicemail system.

11. The voicemail system of claim 8, wherein the voicemail system comprises a voice mail application stored in a memory of a user device.

12. The voicemail system of claim 8, wherein the message is a message type selected from a group of message types consisting of:
a video message;
a text message; and
a voicemail message.

13. The voicemail system claim 8, wherein the instructions for overriding the stored language preference for the called party with the calling-party-selected language preference comprise instructions for overriding the stored language preference for the called party with the calling-party-selected language preference in response to a trigger initiated by the calling party to perform the override.

14. The voicemail system claim 8, wherein the instructions for overriding the stored language preference for the called party with the calling-party-selected language preference comprise instructions for overriding the stored language preference for the called party with the calling-party-selected language preference in response to a trigger initiated by the called party to perform the override.

15. A non-transitory computer-readable storage medium comprising instructions that, when executed by a processor, cause the processor to perform operations comprising:
receiving a call for a called party at the voicemail system, the voicemail system comprising a stored language preference for the called party;
prompting a calling party to leave a message;
creating the message;
providing a plurality of calling-party-selected language preferences;
prompting the calling party to select, from the plurality of calling-party-selected language preferences, a calling-party-selected language preference for the message;
in response to prompting the calling party to select, from the plurality of calling-party-selected language preferences, the calling-party-selected language preference for the message, receiving the calling-party-selected language preference for the message;
overriding the stored language preference for the called party with the calling-party-selected language preference;
determining whether the message is in the calling-party-selected language preference; and
in response to overriding the stored language preference with the calling-party-selected language preference, and if the message is not in the calling-party-selected preferred language identified by the language preference, translating the message into a preferred language of the calling-party-selected preferred language preference, thereby creating a translated message.

16. The non-transitory computer-readable storage medium of claim 15, wherein the medium is a component of a system selected from a group of systems consisting of:
a plain old voicemail system; and
a visual voicemail system.

17. The non-transitory computer-readable storage medium of claim 15, wherein the medium is a component of a user device.

18. The non-transitory computer-readable storage medium of claim 15, wherein the message is a message type selected from a group of message types consisting of:
a video message;
a text message; and
a voicemail message.

19. The non-transitory computer-readable storage medium claim 15, wherein the instructions for overriding the stored language preference for the called party with the calling-party-selected language preference comprise instructions for overriding the stored language preference for the called party with the calling-party-selected language preference in response to a trigger initiated by the calling party to perform the override.

20. The non-transitory computer-readable storage medium claim 15, wherein the instructions for overriding the stored language preference for the called party with the calling-party-selected language preference comprise instructions for overriding the stored language preference for the called party with the calling-party-selected language preference in response to a trigger initiated by the called party to perform the override.

* * * * *